United States Patent
Hong et al.

(10) Patent No.: US 11,140,820 B2
(45) Date of Patent: Oct. 12, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 16/375,217

(22) Filed: Apr. 4, 2019

(65) Prior Publication Data
US 2019/0307063 A1 Oct. 10, 2019

Related U.S. Application Data

(60) Provisional application No. 62/653,568, filed on Apr. 6, 2018.

(30) Foreign Application Priority Data

Oct. 24, 2018 (KR) .......................... 10-2018-0127707

(51) Int. Cl.
*A01D 34/74* (2006.01)
*A01D 34/00* (2006.01)
(Continued)

(52) U.S. Cl.
CPC ........... *A01D 34/74* (2013.01); *A01D 34/008* (2013.01); *A01D 34/64* (2013.01); *A01D 34/82* (2013.01);
(Continued)

(58) Field of Classification Search
CPC .... A01D 34/008; A01D 34/736; A01D 34/78; A01D 34/81; A01D 34/82; A01D 34/64;
(Continued)

(56) References Cited

U.S. PATENT DOCUMENTS 2,464,912 A * 3/1949 White .................... G01B 5/063
33/32.3
3,114,229 A * 12/1963 Wilson .................. A01D 34/74
56/11.8
(Continued)

FOREIGN PATENT DOCUMENTS

AU 2015418271 6/2017
CN 102523841 7/2012
(Continued)

OTHER PUBLICATIONS

Korean Notice of Allowance dated Nov. 23, 2020 issued in KR Application No. 10-2018-0123916.
(Continued)

*Primary Examiner* — Abigail A Risic
(74) *Attorney, Agent, or Firm* — Ked & Associates, LLP

(57) ABSTRACT

A lawn mower robot includes: an outer cover; an inner body accommodated inside the outer cover and having a plurality of wheels on both side surfaces for traveling; a rotating plate rotatably mounted on a bottom surface of the inner body; a plurality of blades rotatably mounted on the rotating plate to cut grass; a height adjustment unit to adjust height of the blades; and a height display unit to display the blade height, wherein the height display unit includes: an inner cover mounted on an upper portion of the outer cover; a display window formed through one side of the inner cover; and a ruler having numerals on an upper surface to display the height of the blades, and mounted inside the inner body to
(Continued)

be movable up and down and back and forth in correspondence to movement of the height adjustment unit.

18 Claims, 10 Drawing Sheets

(51) Int. Cl.
*A01D 34/64* (2006.01)
*A01D 34/82* (2006.01)
*A01D 101/00* (2006.01)
*G05D 1/02* (2020.01)

(52) U.S. Cl.
CPC ....... *A01D 2101/00* (2013.01); *G05D 1/0255* (2013.01); *G05D 2201/0208* (2013.01)

(58) Field of Classification Search
CPC ...... A01D 34/74; A01D 34/66; A01D 34/007; A01D 2101/00; B25J 11/008; G05D 1/0238; G05D 2201/0208
See application file for complete search history.

(56) References Cited

U.S. PATENT DOCUMENTS

| | | | | |
|---|---|---|---|---|
| 4,194,345 | A * | 3/1980 | Pioch | A01D 34/81 56/17.5 |
| 4,835,952 | A * | 6/1989 | McLane | A01D 34/74 280/43.13 |
| 5,259,175 | A * | 11/1993 | Schmidt | A01D 34/74 56/17.2 |
| 6,470,588 | B1 * | 10/2002 | Pilger | G01B 3/006 33/759 |
| 6,999,850 | B2 * | 2/2006 | McDonald | A47L 9/009 700/245 |
| 7,171,799 | B2 | 2/2007 | Takeishi et al. | |
| 8,234,848 | B2 * | 8/2012 | Messina | A01D 34/81 56/17.1 |
| 8,336,282 | B2 | 12/2012 | Messina et al. | |
| 8,387,193 | B2 | 3/2013 | Ziegler et al. | |
| 9,021,777 | B2 * | 5/2015 | Johnson | B60L 1/003 56/320.1 |
| 9,027,189 | B2 * | 5/2015 | Hickenbottom | A01G 20/43 15/79.1 |
| 9,807,930 | B1 | 11/2017 | Lydon et al. | |
| 10,299,432 | B1 * | 5/2019 | Kelly | A01D 34/824 |
| 10,375,880 | B2 * | 8/2019 | Morin | B25J 5/007 |
| 10,555,457 | B2 * | 2/2020 | Song | A01D 34/008 |
| 2005/0021181 | A1 | 1/2005 | Kim et al. | |
| 2005/0044836 | A1 | 3/2005 | Goto et al. | |
| 2012/0023880 | A1 * | 2/2012 | Messina | A01D 34/81 56/10.2 E |
| 2012/0023887 | A1 * | 2/2012 | Messina | B60L 50/66 56/320.1 |
| 2013/0061417 | A1 * | 3/2013 | Vanderstegen-Drake | A47L 9/1409 15/319 |
| 2013/0291506 | A1 | 11/2013 | Johnson et al. | |
| 2014/0216424 | A1 * | 8/2014 | Gartzke | F02M 35/048 123/575 |
| 2015/0271991 | A1 | 10/2015 | Balutis | |
| 2016/0000007 | A1 * | 1/2016 | Bian | A01D 34/824 280/47.371 |
| 2016/0014956 | A1 | 1/2016 | Matsumoto et al. | |
| 2016/0081526 | A1 | 3/2016 | Gottinger et al. | |
| 2016/0128275 | A1 | 5/2016 | Johnson | |
| 2016/0278287 | A1 | 9/2016 | Kasai et al. | |
| 2016/0338262 | A1 | 11/2016 | Liu et al. | |
| 2017/0181375 | A1 * | 6/2017 | Hashimoto | A01D 34/81 |
| 2018/0116109 | A1 | 5/2018 | Matsumoto | |
| 2018/0184583 | A1 * | 7/2018 | Morin | A01D 34/008 |
| 2018/0184585 | A1 | 7/2018 | Song et al. | |
| 2018/0199506 | A1 | 7/2018 | Ito et al. | |
| 2018/0235146 | A1 * | 8/2018 | Hashimoto | A01D 34/78 |
| 2018/0271014 | A1 * | 9/2018 | Matsuzawa | A01D 34/008 |
| 2019/0216012 | A1 | 7/2019 | Hahn et al. | |
| 2019/0223376 | A1 * | 7/2019 | Lee | B25J 13/088 |
| 2019/0258267 | A1 | 8/2019 | Hahn et al. | |
| 2019/0278269 | A1 * | 9/2019 | He | G05D 1/0022 |
| 2020/0170186 | A1 * | 6/2020 | Curtis | F16H 25/20 |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

Korean Notice of Allowance dated Dec. 8, 2020 issued in KR Application No. 10-2018-0142916.
Korean Notice of Allowance dated Dec. 8, 2020 issued in KR Application No. 10-2018-0142917.
Korean Office Action dated May 15, 2020 issued in KR Application No. 10-2018-0123916.
Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
Korean Notice of Allowance dated Jan. 5, 2021 issued in KR Application No. 10-2018-0121333.
United States Office Action dated Mar. 4, 2021 issued in U.S. Appl. No. 16/260,865.
United States Office Action dated Mar. 4, 2021 issued in U.S. Appl. No. 16/264,494.
European Search Report dated Dec. 17, 2019 issued in EP Application No. 19167046.2.

(56) References Cited

OTHER PUBLICATIONS

European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
United States Office Action dated Mar. 11, 2021 issued in U.S. Appl. No. 16/375,400.
United States Notice of Allowance dated Apr. 1, 2021 issued in U.S. Appl. No. 16/375,294.
United States Office Action dated Apr. 9, 2021 issued in U.S. Appl. No. 16/375,505.
United States Office Action dated Apr. 12, 2021 issued in U.S. Appl. No. 16/373,050.
United States Office Action dated Apr. 12, 2021 issued in U.S. Appl. No. 16/375,424.

\* cited by examiner

LAWN MOWER ROBOT

CROSS-REFERENCE TO RELATED APPLICATIONS

Pursuant to 35 U.S.C. § 119(a), this application claims the benefit of the earlier filing date and the right of priority to U.S. Provisional Application No. 62/653,568, filed on Apr. 6, 2018, and Korean Patent Application No. 10-2018-0127707, filed on Oct. 24, 2018, whose entire disclosures are hereby incorporated by reference. This application is also related to U.S. application Ser. No. 16/373,050 filed Apr. 2, 2019, U.S. application Ser. No. 16/375,424 filed Apr. 4, 2019, U.S. application Ser. No. 16/375,505 filed Apr. 4, 2019, U.S. application Ser. No. 16/375,294 filed Apr. 4, 2019, and U.S. application Ser. No. 16/375,400 filed Apr. 4, 2019, whose entire disclosures are also hereby incorporated by reference. This application is also related to U.S. patent application Ser. No. 16/260,865 filed on Jan. 29, 2019 and U.S. patent application Ser. No. 16/264,494 filed on Jan. 31, 2019.

BACKGROUND

1. Field

The present disclosure relates to a lawn mower robot for mowing grass with blades rotated by motors.

2. Background

A lawn mower is a machine that cuts, mows or shaves grass growing in a yard at home, a playground, a golf course and the like. Recently, automated robot-type lawn mowers are under development to eliminate the user's burden to directly operate the lawn mower to cut lawns, and reduce additional costs caused due to employing a person to mow the lawns. The lawn mower robot may travel or move by rotating a plurality of wheels using electric motors mounted on both front and rear sides of a robot body, and a travel direction of the robot may be controlled by controlling the number of revolutions (Revolution per minute; RPM) of the electric motors.

A lawn mower robot is described in Korean Patent Application No. 10-2017-0000416 (filed on Jan. 2, 2017), now issued as Korean Patent No. 10-1915547. The lawnmower robot of the registered patent application is configured in a manner that motors are mounted in an inner body and blades are rotated using power of the motors to mow lawns.

In the lawn mower robot of the Registration Patent Application, an elevating frame is installed in an inner body to be movable in an up and down direction, and a rotating plate for rotating blades is mounted on a bottom surface of the elevating frame, so as to adjust height of the blades such that the blades are movable up and down with respect to the ground. In addition, a height adjustment lever may be mounted on a top of the inner body to adjust the height of the blades, scales are displayed on a top surface of the height adjustment lever along a circumferential direction to make a user recognize the height of the blades, and an indicator in a triangular shape is provided on the inner body.

For example, the user can recognize the height of the blades by rotating the height adjustment lever in the range of 0° to 360° and reading a scale indicated by the indicator. However, the related art lawn mower robot has a limitation in displaying the height of the blades in a wide range because the scale indicating the height of the blades is displayed in the range of 0° to 360° along the circumferential direction of the height adjustment lever. For example, if the height of the blades is adjusted to 20 mm to 60 mm, the height may be displayed by the height adjustment lever within 360°. However, if the height exceeds 60 mm or more, it is difficult to display the height.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
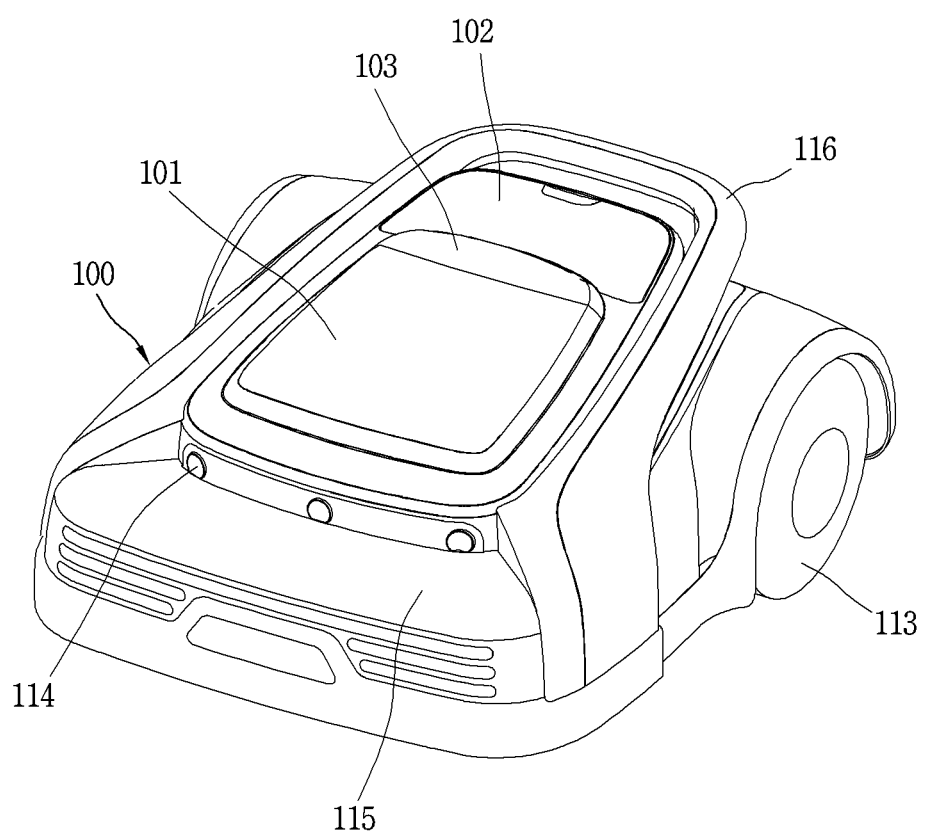
FIG. 1 is a perspective view illustrating appearance of a lawn mower robot in accordance with the present disclosure.
Figure 2:
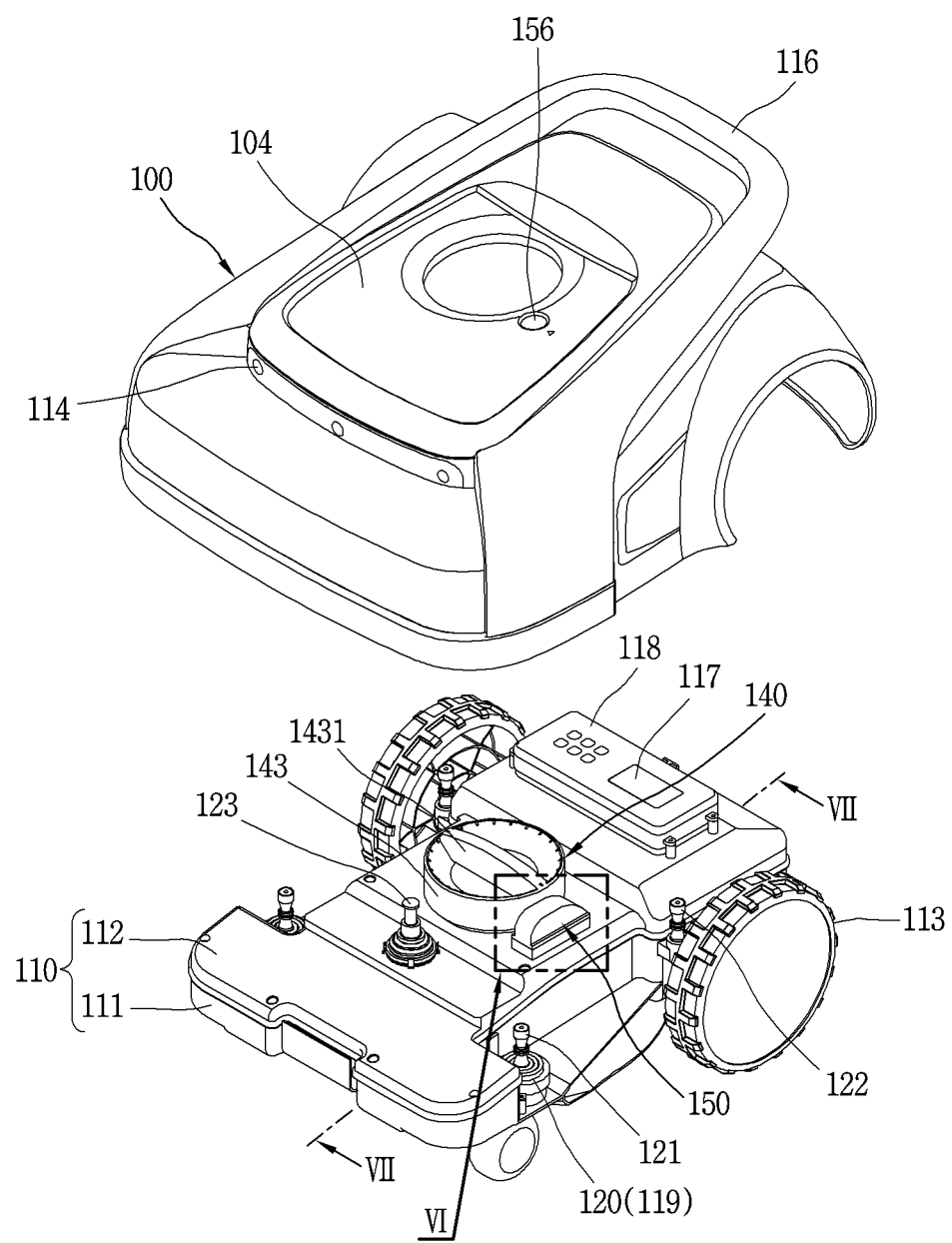
FIG. 2 is a conceptual view illustrating a state where an outer cover is disassembled from an inner body in FIG. 1.
Figure 3:
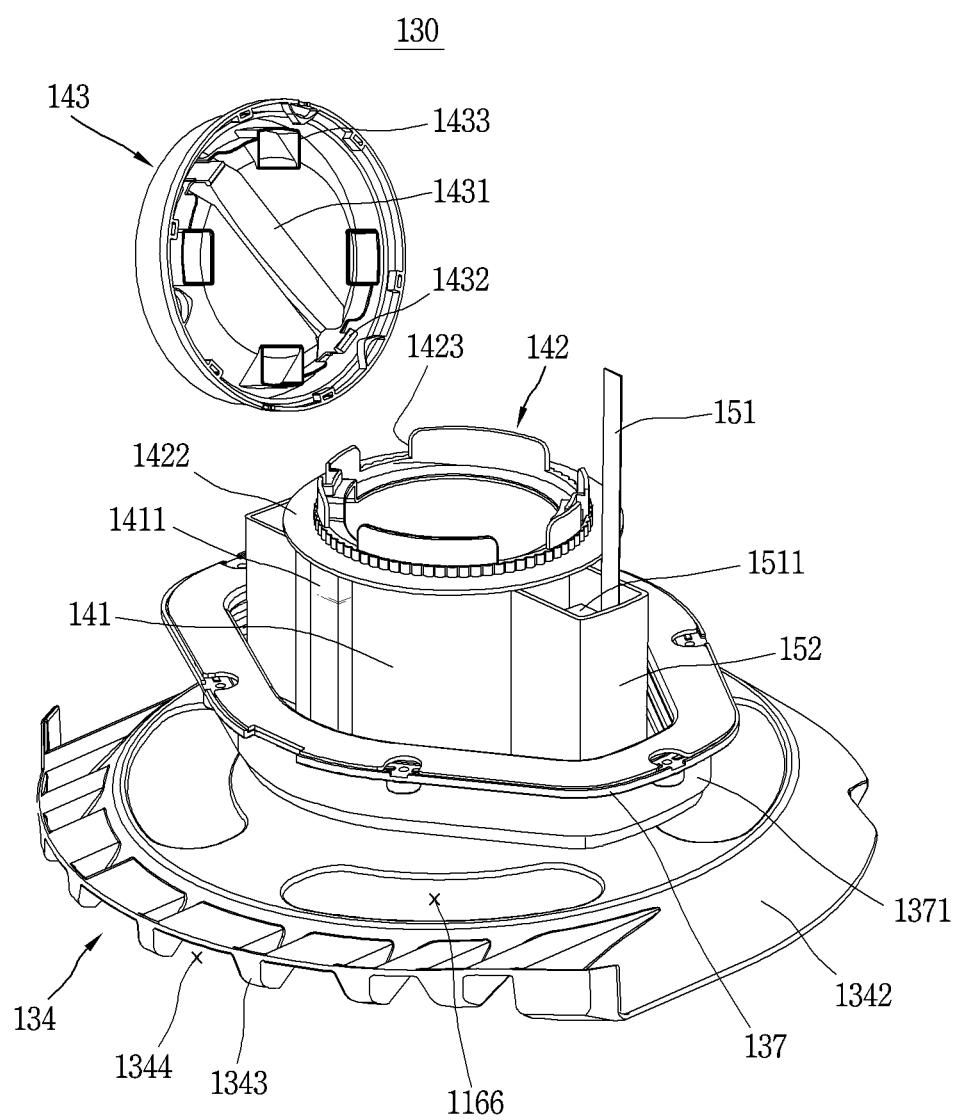
FIG. 3 is a conceptual view illustrating a blade assembly in FIG. 2.
Figure 4:
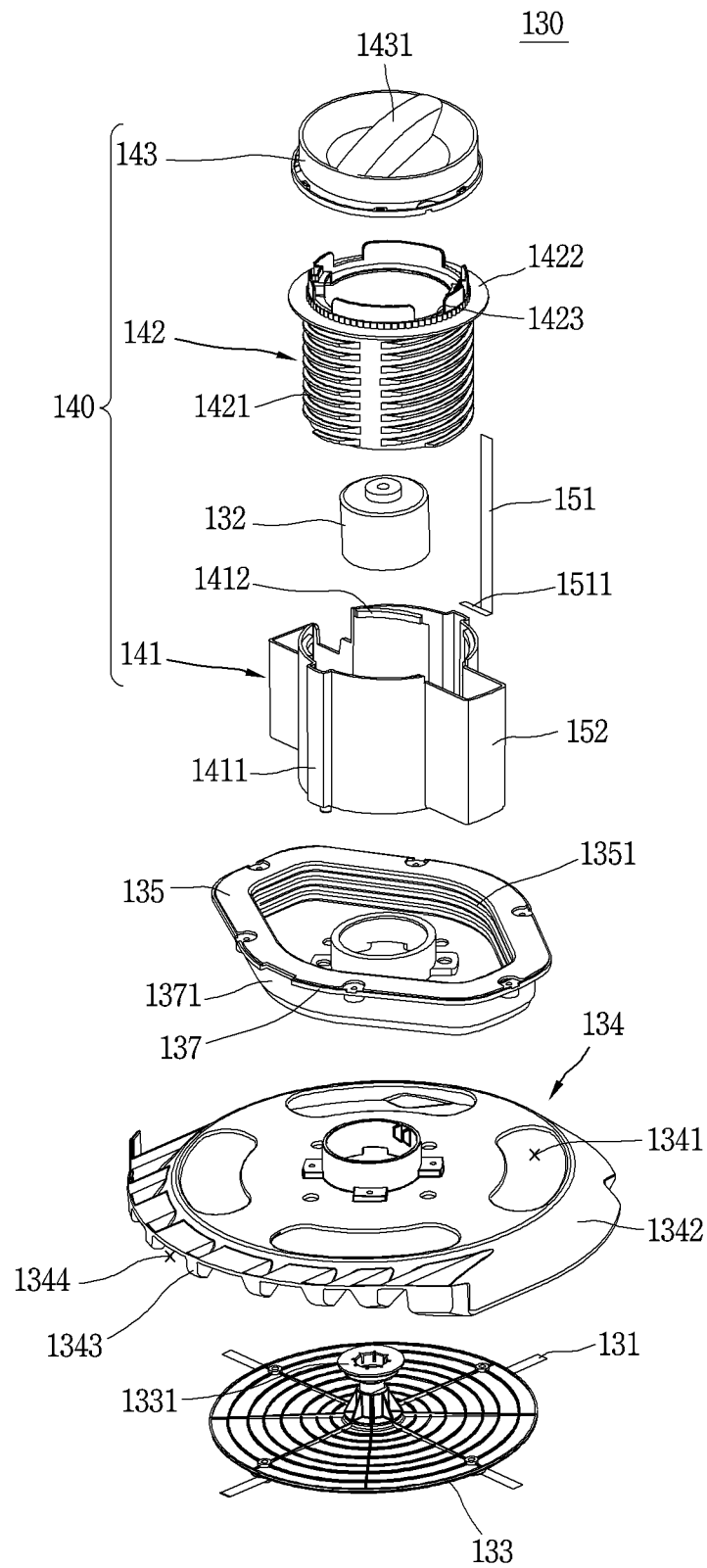
FIG. 4 is a conceptual view illustrating a state where the blade assembly is disassembled in FIG. 3.
Figure 5:
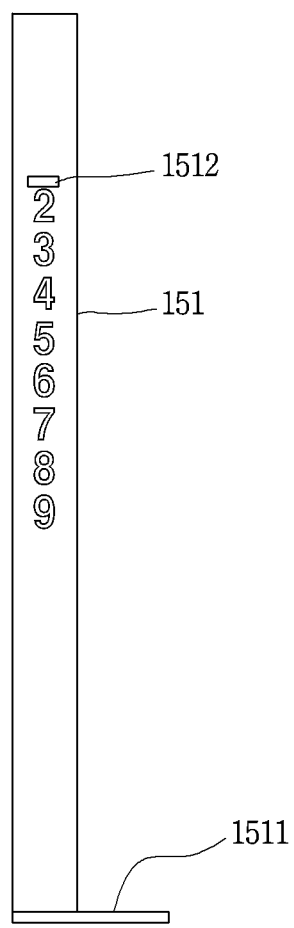
FIG. 5 is a front view illustrating a ruler in FIG. 4.
Figure 6:
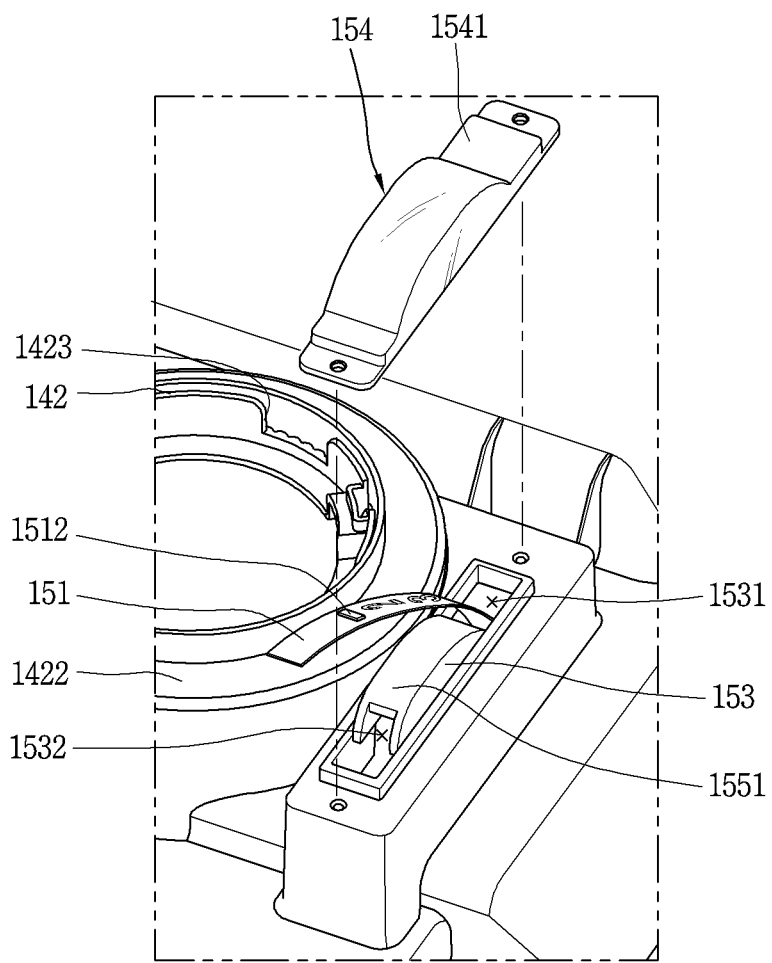
FIG. 6 is a conceptual view illustrating a disassembled state of a ruler guide cover by enlarging a part "VI" in FIG. 2.
Figure 7:
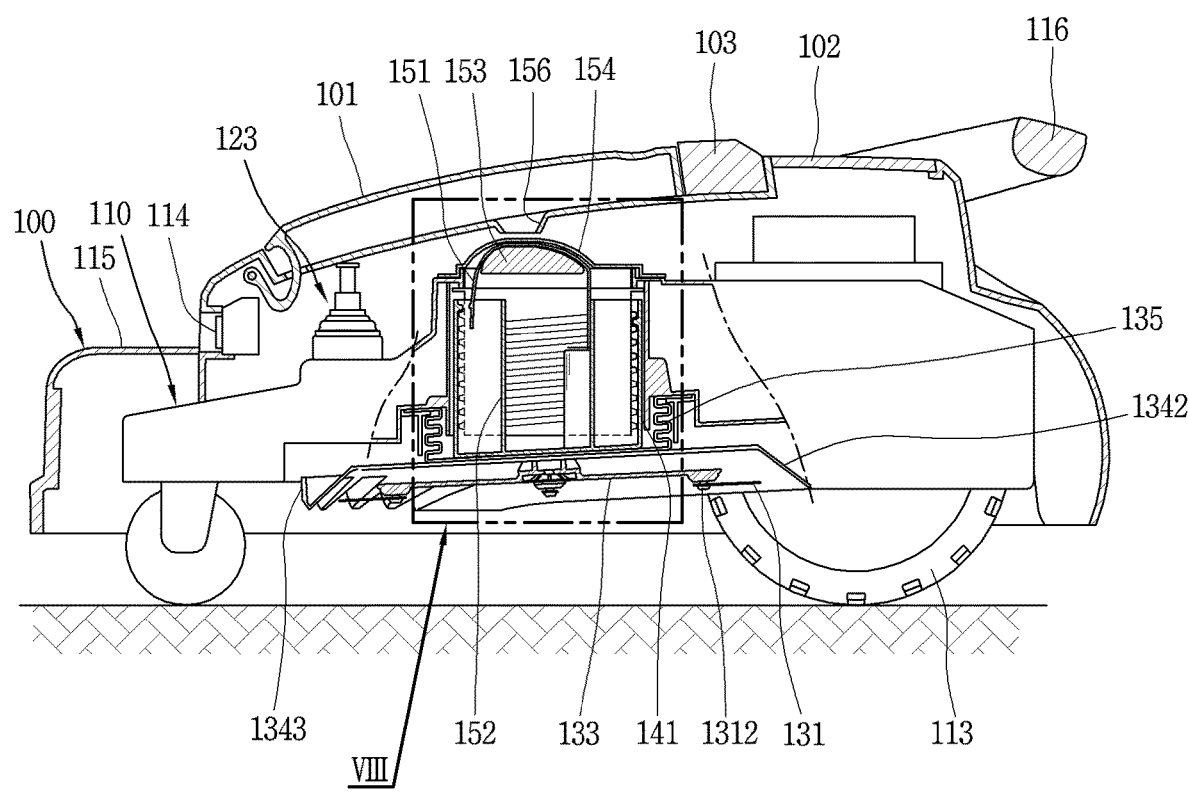
FIG. 7 is a sectional view illustrating a blade height display unit, taken along the line VII-VII in FIG. 2.
Figure 8:
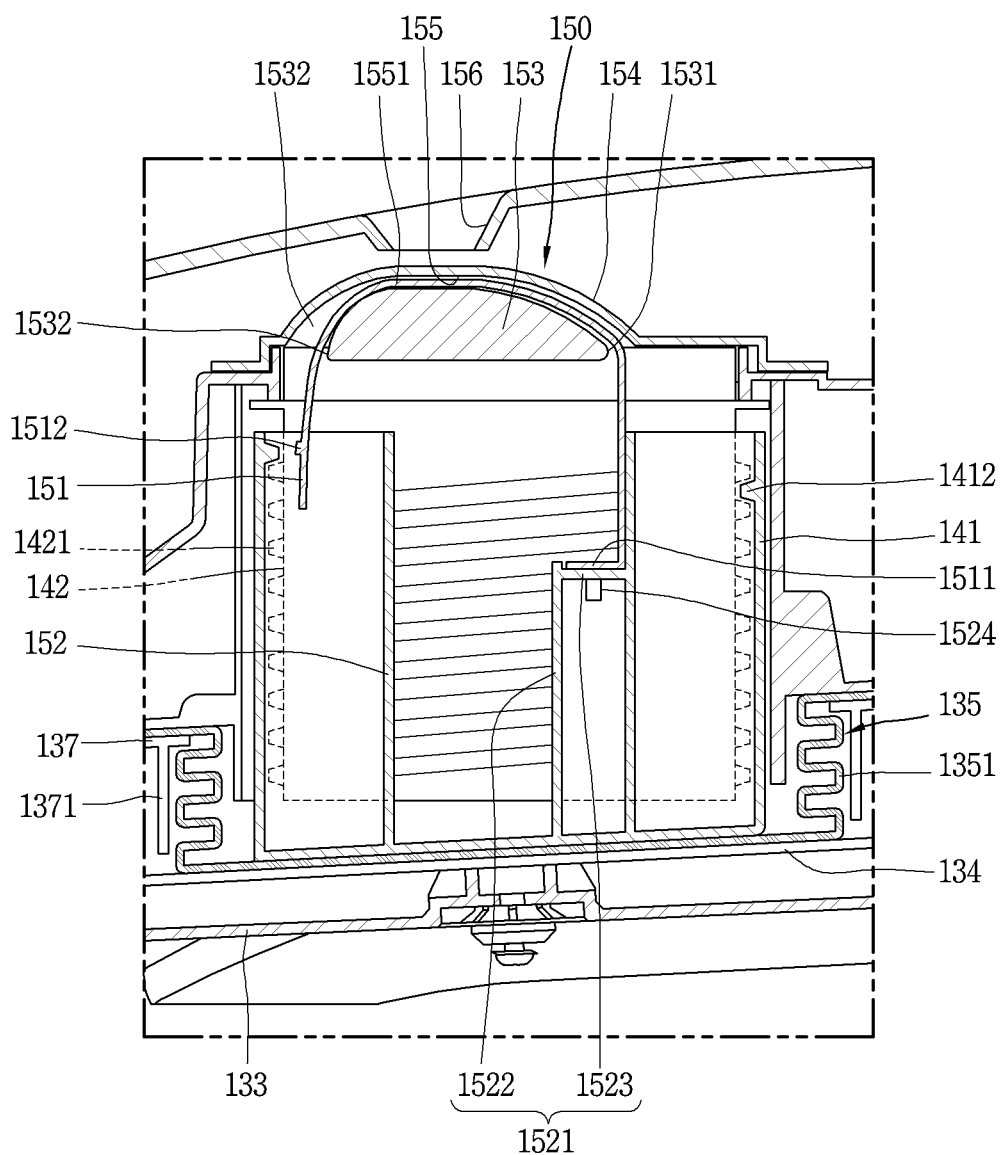
FIG. 8 is an enlarged view of a part "VIII" in FIG. 7.
Figure 9:
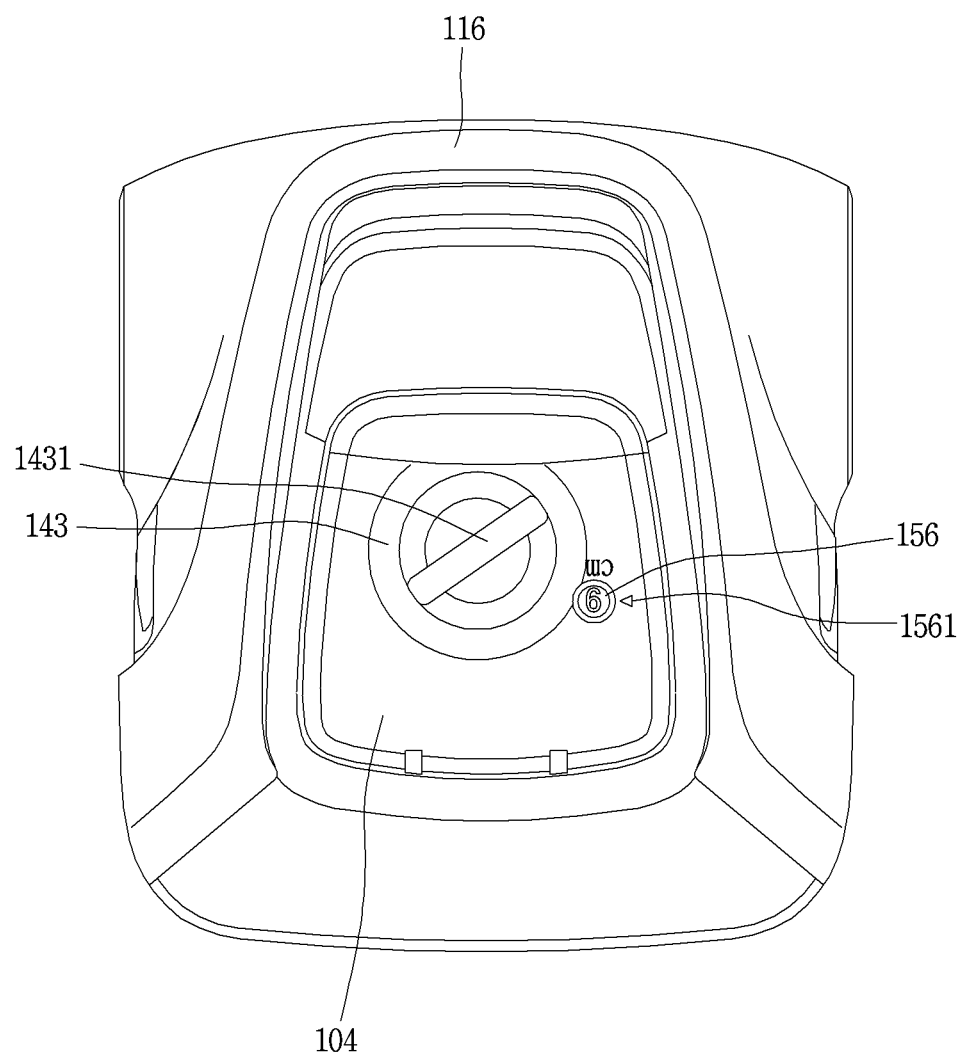
FIG. 9 is a planar view illustrating a height adjustment knob and a display window formed on a top of an outer cover after removing a first top cover in FIG. 2.
Figure 10:
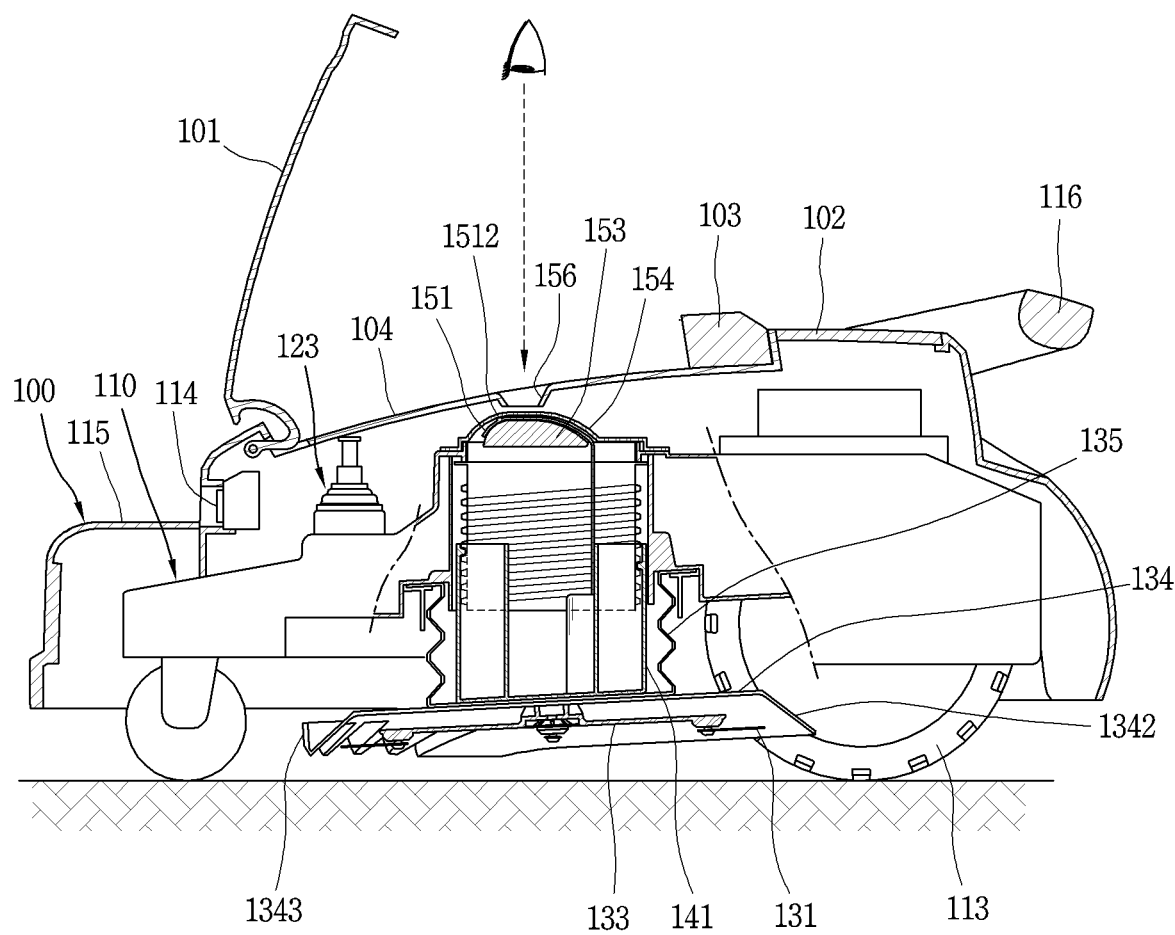
FIG. 10 is an operational state view showing a state of visually viewing a number of a ruler when a height of a blade is at the lowest position in FIG. 7.

FIG. 1 is a perspective view illustrating appearance of a lawn mower robot in accordance with the present disclosure, FIG. 2 is a conceptual view illustrating a state where an outer cover 100 is disassembled from an inner body 110 in FIG. 1, FIG. 3 is a conceptual view illustrating a blade assembly 130 in FIG. 2, FIG. 4 is a conceptual view illustrating a disassembled state of the blade assembly 130 in FIG. 3, FIG. 5 is a front view illustrating a ruler 151 in FIG. 4, FIG. 6 is a conceptual view illustrating a disassembled state of a ruler guide cover 154 by enlarging a part "VI" in FIG. 2, FIG. 7 is a sectional view illustrating a blade height display unit 150, taken along the line VII-VII in FIG. 2, FIG. 8 is an enlarged view of a part "VIII" in FIG. 7, FIG. 9 is a planar view illustrating a height adjustment knob 143 and a display window 156 formed on a top of an outer cover 100 after removing a first top cover 101 in FIG. 2, and FIG. 10 is an operational state view showing a state of visually viewing a numeral of a ruler 151 when a height of a blade 131 is at the lowest position in FIG. 7.

A lawn mower robot according to the present disclosure includes an outer cover 100 that encloses an outside of the robot. The outer cover 100 is configured to enclose the inner body 110.

A plurality of wheels 113 is rotatably mounted on both side surfaces of the inner body 110 so that the robot can travel in a desired direction. Wheel driving motors may be mounted on both side surfaces of the inner body 110. Each of the plurality of wheels 113 may be connected to a rotating shaft of the wheel driving motor so as to be rotatable.

A plurality of ultrasonic sensor modules 114 may be mounted on a front upper portion of the outer cover 100. Each of the plurality of ultrasonic sensor modules 114 may send an ultrasonic wave and receive a reflected wave by an obstacle located in front of the ultrasonic sensor module 102, so as to detect the obstacle.

The plurality of ultrasonic sensor modules 114 may be mounted on the upper portion of the outer cover 100 at a preset height. For example, an ultrasonic guide portion 115 may be formed in a planar shape on the front upper surface of the outer cover 100, and the plurality of ultrasonic sensor modules 114 may be disposed at the rear of the ultrasonic guide unit 115.

With such a configuration, the ultrasonic wave emitted from the ultrasonic sensor module 114 can be transmitted forward by a preset height or more by the ultrasonic guide portion 115, thereby limiting a lower limit of the emission range of the ultrasonic wave.

The ultrasonic wave cannot reach an object, for example, lawns and the like, which is located lower than the ultrasonic guide portion 115. This may result in preventing such lawns from being mistaken as an obstacle. Also, the ultrasonic wave may be emitted to an obstacle, for example, a tree or the like, which is located higher than the ultrasonic guide portion 115, thereby detecting such tree or the like as an obstacle.

A handle 116 may be provided on a top of the outer cover 100 so that a user can grip the handle 116 to carry the robot. A front end portion of the handle 116 may be coupled to both right and left surfaces of a front portion of the outer cover 100, and a rear end portion may extend from the front end portion to be upwardly inclined to the rear. When viewing the outer cover 100 from a top, the handle 116 may be formed in a shape similar to "U".

The outer cover 100 may include a first top cover 101 and a second top cover 102 so that rainwater falling from the sky cannot be accumulated on a top of the robot during outdoor use. The first top cover 101 and the second top cover 102 may be mounted on the top of the outer cover 100 so as to be opened and closed in an up and down direction. Each of the first and second top covers 101 and 102 may be formed in a curved shape inclined downward from a completely central portion to right and left sides along a widthwise direction of the outer cover 100, thereby preventing rainwater or the like from being accumulated on the top of the outer cover 100.

A rear end portion of the first top cover 101 in a lengthwise direction thereof may be formed in a curved shape to be gradually downwardly inclined from a rear end portion toward a front end portion so that the rear end portion is located higher than the front end portion, which may result in guiding rainwater to roll from a rear upper portion down to a front lower portion of the first top cover 101.

A rear end portion of the second top cover 102 in a lengthwise direction thereof may be formed in a curved shape to be gradually downwardly inclined from a front end portion toward a rear end portion so that the rear end portion is located lower than the front end portion, which may result in guiding rainwater or the like to roll from a front upper portion down to a rear lower portion of the second top cover 102. Each of the first top cover 101 and the second top cover 102 may have a front end portion coupled to the inner body 100 with a hinge and a rear end portion mounted to be rotatable up and down.

A stop switch 103 may be provided on the top of the outer cover 100 so as to stop an operation of the robot. The stop switch 103 may be disposed between the first top cover 101 and the second top cover 102. The stop switch 103 may be positioned at the front rather than the rear end portion (a grip portion that the user grips with a hand) of the handle 116. The stop switch 103 and the handle 116 may be formed to be located at the same or similar height.

With such a configuration, for example, in the case where branches are stretched down to the height of the stop switch 103 on a traveling path of the robot, when the robot travels under the branches, the branches are first brought into contact with the stop switch 103 and press the stop switch 103 to stop the travel of the robot, which may prevent the rear end portion of the handle 116 from being caught on the branches.

The inner body 110 includes a wheel driving unit for driving the wheels 113, supporting portions 119 for supporting the outer cover 100 in front, rear, right and left directions, a blade assembly 130 for adjusting a height of the blades 131, and the like. The inner body 110 may include an inner body main part 111 and an inner body cover 112. The inner body cover 112 may be coupled to a top of the inner body main part 111 in a covering manner.

The wheel driving unit may include a wheel driving motor supporter for mounting a plurality of wheel driving motors in both sides of the inner body 110, and wheel driving motors accommodated in the wheel driving motor supporter. The wheel driving motor supporter extends in a widthwise direction of the inner body 110 to support the wheel driving motors.

A display 117 and a control panel 118 may be mounted on a rear upper portion of the inner body 110 and a plurality of operation buttons may be provided on the control panel 118 so that the user can perform various functions. A charging terminal may be provided on the front of the inner body 110, so that a battery can be charged through the charging terminal.

A plurality of supporting portions 119 may be mounted on right and left sides of the front of the inner body 110 and on right and left sides of the rear of the inner body 110. Each of the plurality of supporting portions 119 may have a middle part in a shape of a thin rod. An upper end part may be coupled to an inner surface of the upper portion of the outer cover 100, and a lower end part may be coupled to the inner body 110.

The plurality of supporting portions 119 may be made of a rubber material. Each of the plurality of supporting portions 119 may be configured to be bent or curved in front, back, right and left directions. For example, each of a plurality of first supporting portions 120 mounted on the front of the inner body 110 may have a bellows-shaped corrugate portion 121. The first supporting portion 120 may be elastically supported by the corrugate portion 121 so as to be movable in the front, rear, right and left directions. The corrugate portion 121 may be made of a rubber material.

Each of a plurality of second supporting portions 122 mounted on the rear of the inner body 110 may have a structure in which a lower end part is elastically supported so that an upper end part can be bent or curved in the back and forth direction and the right and left direction. With this configuration, the plurality of supporting portions 119 can elastically support the outer cover 100 so that the outer cover 100 can move in the back and forth direction and the right and left direction with respect to the inner body 110 when the outer cover 100 collides with an obstacle.

A joystick bumper 123 may be mounted on a front portion of the inner body 110 so as to be movable in the back and forth direction and the right and left direction. An upper end portion of the joystick bumper 123 may be coupled to the outer cover 100 and a middle portion of the joystick bumper 123 may be provided with a joint protrusion coupled to the inner body, so that the joystick bumper 123 can rotate in the back and forth direction and the right and left direction.

A lower end portion of the joystick bumper 123 may be configured to be movable in the back and forth direction and the right and left direction with respect to the joint protrusion. The joystick bumper 123 may have a restoring spring, so as to restore or return the outer cover 100, which has moved due to collision with an obstacle, to its original position. An upper end portion of the restoring spring may be fixed to the inner body 110 and a lower end portion of the restoring spring may be fixed to the joystick bumper 123 to elastically support the joystick bumper 123.

The blade assembly 130 includes a plurality of blades 131, a blade driving motor, a rotating plate 133, a blade protection cover 134, a blade height adjustment unit 140, and a blade height display unit 150. The plurality of blades 131 may be formed in a rectangular shape whose length is longer than a width, and have cross-section in a parallelogram shape. The plurality of blades 131 may be mounted on a lower surface of the rotating plate 133 to rotate together with the rotating plate 133.

Each of the plurality of blades 131 may be configured such that one end is coupled to the rotating plate 133 by a coupling bolt 1312 and another end rotatable centering on the coupling bolt 1312. Each of the plurality of blades 131 may be configured to be unfolded outward in a radial direction of the rotating plate 133 by centrifugal force while rotating together with the rotating plate 133, or folded inward in the radial direction of the rotating plate 133 when the rotating plate 133 is stopped. With this configuration, since the blade 131 is folded to the inside of the rotating plate 133 when colliding with a stone or the like, thereby minimizing breakage of the blade 131.

The blade protection cover 134 may be configured to block debris of a stone, which is generated when the blade 131 collides with the stone, from being bounced out of the outer cover 100. The blade protection cover 134 may be provided with an inclined portion 1342 inclined downward from an upper surface thereof. The inclined portion 1342 may extend to be inclined downward in a manner of being lower than a plane perpendicular to a central axis of the rotating plate 133 or a plane perpendicular to the coupling bolt 1312 which serves as a rotating shaft of the blade 131.

The upper surface of the blade protection cover 134 may be formed in a circular shape. A plurality of through holes 1341 may be formed through the upper surface of the blade protection cover 134. The plurality of through holes 1341 may be spaced apart from one another along a circumferential direction. The plurality of through holes 1341 may extend into an arcuate shape.

With this configuration, debris of a stone which is generated due to collision between the blade 131 and the stone can get hit a lower portion of the inner body 110 by passing through the plurality of through holes 1341 formed through the upper surface of the blade protection cover 134. Accordingly, such stone debris can be turned back by the inner body 110 or the like so as to be dropped on the ground without being bounced out of the outer cover 100.

In addition, the plurality of through holes 1341 can reduce the number of times that the stone debris is hit on the upper surface of the blade protection cover 134, thereby reducing vibration and noise caused by the collision between the blade protection cover 134 and the stone debris and additionally minimizing impact transferred from the stone debris to the blade protection cover 134.

A plurality of protrusions 1343 and a plurality of grass entrance ports 1344 may be formed on the front of the blade protection cover 134, instead of the inclined portion 1342. The plurality of grass entrance ports 1344 and the plurality of protrusions 1343 may be alternately disposed along a circumferential direction of the blade protection cover 134.

The grass entrance ports 1344 allow grass to smoothly enter the blades 131. If the inclined portion 1342 is formed without the grass entrance ports 1344 on the front of the blade protection cover 134, grass may be obstructed by the inclined portion 1342 from entering the inside of the blade protection cover 134. Therefore, the plurality of grass entrance ports 1344 is preferably formed on the front of the blade protection cover 134.

The plurality of protrusions 1343 may protrude downward from the upper surface of the blade protection cover 134 and may be spaced apart at narrower intervals from a completely central portion to right and left sides in the circumferential direction. According to such a configuration, the plurality of protrusions 1343 may block debris of a stone, which is generated due to collision of the blade 131 with the stone, etc., from being scattered in the left and right direction of the blade protection cover 134.

The blade height adjustment unit 140 may include an elevating frame 141, a rotating cylindrical portion (or cylinder) 142, and a height adjustment knob (or knob) 143. The elevating frame 141 may be mounted inside the inner body 110 so as to be movable up and down. An accommodating portion for accommodating the elevating frame 141 and the like may be formed through the inner body 110 in an up and down direction.

The elevating frame 141 may have a hollow cylindrical shape. An upper portion of the elevating frame 141 may be opened and a lower portion of the elevating frame 141 may be closed.

A plurality of anti-rotation portions 1411 may be formed on an outer circumferential surface of the elevating frame 141 in a manner of extending in an up and down direction and protruding outward in a radial direction. The anti-rotation portions 1411 are coupled to anti-rotation grooves (not shown) formed in the accommodating portion of the inner body 110, so as to allow upward and downward movement of the elevating frame 141 but restrict rotation in the circumferential direction.

A plurality of spiral protrusions 1412 may be formed on an inner circumferential surface of the elevating frame 141. The plurality of spiral protrusions 1412 may allow the elevating frame 141 to be connected to the rotating cylindrical portion 142 so that the elevating frame 141 can move up and down along the rotating cylindrical portion 142.

The rotating cylindrical portion 142 may be accommodated in the elevating frame 141. Male threaded portions 1421 may be formed on an outer circumferential surface of the rotating cylindrical portion 142. The male threaded portions 1421 may be engaged with the spiral protrusions 1412 of the elevating frame 141.

A drop-restricting portion 1422 may be formed on an upper end portion of the rotating cylindrical portion 142 in a manner of protruding outward in a radial direction and extending along a circumferential direction. A plurality of coupling grooves 1423 may be formed on an upper end of the rotating cylindrical portion 142 with being spaced apart along a circumferential direction, so that the rotating cylindrical portion 142 can be connected to the height adjustment knob 143 for rotation.

The height adjustment knob 143 may be formed in a circular shape. The height adjustment knob 143 may be formed in a circular shape and may have a diameter the same as or similar to that of the rotary cylindrical portion 142.

A handle 1431 may be formed on an upper surface of the height adjustment knob 143 in a protruding manner so that the handle 1431 can be gripped by a user's hand. The handle 1431 may extend in a diametrical direction. The user can rotate the height adjustment knob 143 by gripping and rotating the handle 1431 by a hand.

Arrows and marks Up and Down may be displayed clockwise or counterclockwise on the upper surface of the height adjustment knob 143, so that the user can check the arrows and marks and adjust the height of the blade 131 according to a rotating direction of the height adjustment knob 143.

A plurality of coupling hooks 1432 may protrude downward from a lower surface of the height adjustment knob 143. The plurality of coupling hooks 1432 may be coupled to hook coupling portions 1541 formed on an upper end of the rotating cylindrical portion 142, thereby coupling the height adjustment knob 143 and the rotating cylindrical portion 142 to each other.

A plurality of rotating protrusions 1433 may be formed on the lower surface of the height adjustment knob 143. The plurality of rotating protrusions 1433 may be engaged with the plurality of coupling grooves 1423 formed on the upper end of the rotating cylindrical portion 142, so that the height adjustment knob 143 and the rotating cylindrical portion 142 can be coupled to be rotatably together.

With this configuration, when the user rotates the height adjustment knob 143, the rotating cylindrical portion 142 coupled to the lower portion of the height adjustment knob 143 can rotate in place, and the male threaded portions 1421 of the rotating cylindrical portion 142 are rotated in engagement with the spiral protrusions 1412 of the elevating frame 141. As a result, the elevating frame 141 can move up and down.

The blade protection cover 134, the rotating plate 133 and the plurality of blades 131 may be mounted on a lower portion of the elevating frame 141 and move up and down together with the elevating frame 141, thereby adjusting the height. The blade driving motor may be mounted inside the elevating frame 141 to rotate the rotating plate 133. A shaft coupling portion 1331 may be formed on an upper central portion of the rotating plate 133 so that the rotating shaft of the blade driving motor and the shaft coupling portion 1331 can be coupled to each other.

The blade protection cover 134 may be mounted on the lower portion of the elevating frame 141. An upper surface of the blade protection cover 134 may be disposed at an upper portion of the rotating plate 133 in an upwardly spaced manner, and the rotating plate 133 may be rotatably mounted with respect to the blade protection cover 134.

A sealing portion 135 made of rubber may be provided between the lower portion of the inner body 110 and the upper surface of the blade protection cover 134 to prevent water or the like from penetrating into the inner body 110. For example, the sealing portion 135 may prevent water from penetrating into the inner body 110 when the lower portion of the inner body 110 is in water in a puddle while the robot passes through the puddle. The sealing portion 135 is provided with a corrugate (wrinkle) portion 1351 formed in a bellows shape on a side surface thereof and extending in an up and down direction, so as to be adjustable in length in the up and down direction.

An upper end portion of the sealing portion 135 may be coupled to the lower surface of the inner body 110 and a lower end portion of the sealing portion 135 may be coupled to a lower end portion of the elevating frame 141. The lower end portion of the sealing portion 135 may be stacked on the upper surface of the blade protection cover 134.

With such configuration, even when the height of the blade 131 or the like is adjusted from the ground by the blade height adjustment unit, a height of the sealing portion 135 can be adjusted in the up and down direction according to the height of the blade 131, the blade protection cover 134 or the like. A mounting guide 137 may be provided to mount the upper end portion of the sealing portion 135 to the lower portion of the inner body 110.

An adhesion portion in a planar shape may be formed on a top of the mounting guide 137 to allow an upper coupling portion (or coupling protrusion) 1511 formed in a planar shape on the upper end portion of the sealing portion 110 to be in surface contact with the inner body 110, thereby enhancing adhesion between the sealing portion 135 and the inner body 110.

The mounting guide 137 may further include a shielding wall 1371 extending perpendicularly downward from the adhesion portion of the mounting guide 137. The shielding wall 1371 may be configured to surround the corrugate portion 1351 of the sealing portion 135. According to such a configuration, the shielding wall 1371 can block the sealing portion 135 from colliding with stone debris or the like, thereby minimizing damage to the sealing portion 135.

The blade height display unit 150 may include a ruler (or ruler strip) 151, a ruler mounting portion (or ruler mount or ruler mounting surface) 152, a ruler guide (or ruler guide or ruler guide surface) portion 153, and a display window 156. The ruler 151 may be thin, have a longer length than a width, have a rectangular cross-sectional shape, and be formed in a band or strip-like shape. The ruler 151 may be made of a flexible material.

Roman numerals may be provided on the ruler in various manners such as printing, engraving, embossing, etc., so that the user can quickly recognize the height of the blade 131. For example, Roman numerals 2 to 9 may be marked on the ruler 151. The Roman numerals 2 to 9 may be displayed at intervals of 1 cm. The numeral 2 (cm) may be the lowest value of the height of the blade 131, and the numeral 9 (cm) may be the highest value of the height of the blade 131. The user can adjust the height of the blade 131, which is spaced upward from the ground, within the range of 2 cm to 9 cm.

A stop protrusion 1512 may be formed on an upper end portion of the ruler 151. The stop protrusion 1512 may be formed directly above the numeral 2 in a manner of extending in a widthwise direction of the ruler 151. The stop protrusion 1512 is locked in the ruler guide portion 153 so that the ruler 151 can be prevented from being detached from the ruler guide portion 153.

A coupling portion (or coupling protrusion) 1511 may be further provided at a lower end portion of the ruler 151. The coupling portion 1511 may have a structure of protruding forward from the lower end portion of the ruler 151, which perpendicularly extends, by being bent at an angle of 90 degrees. In addition, the coupling portion 1511 may extend to one side in the widthwise direction of the ruler 151. A coupling hole may be formed in the coupling portion 1511, and a coupling member such as a screw may be inserted through the coupling hole, so that the coupling portion 1511 and the elevating frame 141 can be coupled.

A ruler mounting portion 152 may be formed on each of right and left side surfaces of the elevating frame 141. The ruler mounting portions 152 may protrude from the right and left side surfaces of the elevating frame 141 in a right and left direction. The ruler mounting portions 152 may be formed in a rectangular box structure having one surface opened inwardly and three surfaces closed. A fixing portion 1521 for fixing the ruler 151 may be formed inside each of the ruler mounting portions 152.

The fixing portion 1521 may include a perpendicular partition wall 1522 extending upward from an inner bottom surface of the ruler mounting portion 152 and a coupling partition wall 1523 extending horizontally from the perpendicular partition wall 1522 to one side surface of an inside of the ruler mounting portion 152.

A boss portion 1524 may be formed to protrude downward from a lower surface of the coupling partition wall 1523 and a screw or the like may be coupled to an inside of the boss portion 1524.

The coupling portion 1511 of the ruler 151 may be stacked on the coupling partition wall 1523 in an overlapping manner in a thickness direction, and a coupling member such as a screw may be inserted through the coupling portion 1511 and the coupling partition wall 1523, thereby coupling the lower end portion of the ruler 151 to the elevating frame 141. An upper portion of the ruler 151 may be bent upward and forward in the ruler mounting portion 152 and movable back and forth along the ruler guide portion 153.

The coupling partition wall 1523 may be located lower than an upper end of the perpendicular partition wall 1522 and may be disposed lower than an upper end of the ruler mounting portion 152. The coupling portion 1511 and the ruler 151 may extend perpendicular to each other.

For example, the ruler 151 extends perpendicularly in an up and down direction, and the coupling portion 1511 may extend from the lower end of the ruler 151 in a back and forth direction, so that the ruler 151 and the coupling portion 1511 can perpendicularly intersect with each other. With this configuration, when the coupling portion 1511 is coupled to the coupling partition wall 1523, the upper portion of the ruler 151 may extend upward and may be bent into an upside-down shape of "U" toward the ruler guide portion 153, so as to penetrate through a guide hole 155 between the ruler guide portion 153 and a ruler guide cover 154. Accordingly, the ruler 151 can smoothly move up and down in response to the movement of the elevating frame 141 and back and forth along the ruler guide portion 153.

The ruler guide portion 153 may be formed to protrude from the upper portion of the inner body 110 to guide the movement of the ruler 151. The ruler guide portion 153 may extend at the upper portion of the inner body cover 112 in a lengthwise direction of the inner body 110.

The ruler guide cover 154 may be mounted above the ruler guide portion 153 to cover the ruler guide portion 153. A plurality of coupling portions 1541 may be formed to protrude from a front end portion and a rear end portion of the ruler guide cover 154 in a lengthwise direction of the ruler guide cover 154, respectively, along a back and forth direction.

A coupling hole may be formed in each of the plurality of coupling portions 1541, and a coupling member such as a screw may be inserted through the coupling portion 1541 to be coupled to the upper portion of the inner body 110. The guide hole 155 may extend along an upper surface of the ruler guide portion 153 so that the ruler 151 can pass between the ruler guide cover 154 and the ruler guide portion 153.

A bottom surface of the ruler guide portion 153 may extend in a planar shape and a top surface of the ruler guide portion 153 may be inclined in a curved shape. A rear end portion of the ruler guide portion 153 in the lengthwise direction may have a more gradual inclination than that of a front end portion thereof. For example, the inclination of the top surface may become gradual from the rear end to the front of the ruler guide portion 153, and becomes rapid from the highest point to the front end.

An inner surface of the ruler guide cover 154 may be formed inclined in a curved shape and inner surfaces of the front portion and the rear portion of the ruler guide cover 154 in the lengthwise direction may be gently formed with an almost similar inclination. With such a configuration, the ruler 151 can easily enter the rear end portion of the guide hole 155 in the lengthwise direction of the guide hole 155, and smoothly move downward into the inner space of the inner body 110 through the front end portion of the guide hole 155.

An inlet 1531 and an outlet 1532 may be spaced apart from each other on the bottom surface of the ruler guide portion in a back and forth direction. The inlet 1531 may communicate with a rear end portion of the guide hole 155 so that the ruler can be inserted into the guide hole 155. The outlet 1532 may communicate with the front end portion of the guide hole 155 so that the ruler can protrude into the inner space of the inner body through the guide hole 155.

The guide hole 155 through which the ruler 151 moves may not have a uniform sectional size. For example, along the top surface of the ruler guide portion 153, the rear end portion of the guide hole 155 may have a substantially medium sectional size, the middle uppermost portion of the guide hole 155 at the highest point of the ruler guide portion 153 may have the narrowest sectional size, and the front end portion of the guide hole 155 may have the greatest sectional size.

A bottleneck portion 1551 having the narrowest hole size may be formed at the middle uppermost portion of the guide hole 155. With this configuration, when adjusting the height of the blade 131, the stop protrusion 1512 of the ruler 151 can be stuck in the bottleneck portion 1551 of the guide hole 155, thereby preventing the ruler 151 from being detached downward from the ruler guide portion 153.

The ruler guide cover 154 may be made of a transparent material or may be provided with a through hole 1341 formed in one side of the upper portion of the ruler guide cover 154. This embodiment illustrates that the through hole 1341 is not provided because the ruler guide cover 154 is made of a transparent material. Accordingly, the user can visually identify the numerals on the ruler 151 moving along the upper surface of the ruler guide portion 153 through the transparent guide cover.

The inner cover 104 may be installed inside the first top cover 101 of the outer cover 100. The inner cover 104 may be detachably coupled to the outer case 100. The inner cover 104 may be spaced upwardly from the upper portion of the inner body 110 and cover an upper end portion of the joystick bumper 123 and the upper portion of the blade assembly 130.

An opening may be formed through the inner cover 104 in a thickness direction. The opening may be formed in a circular shape so as to surround an outside of the blade height adjustment knob 143 so that the blade height adjustment knob 143 can be exposed upward through the opening. The display window 156 may be formed on the inner cover 104 to correspond to the through hole 1341 of the ruler guide cover 154 in an up and down direction. The display window 156 may be disposed adjacent to the height adjustment knob 143.

The display window 156 may be formed in a penetrating manner in a thickness direction. The display window 156 may be tapered so that its diameter is reduced from upper to lower ends thereof in the thickness direction. A diameter of a lower end of the display window 156 may be formed so that numerals can be in contact with an inner edge of the display window 156, thereby improving visibility of the user with respect to a numeral displayed through the display window 156.

A unit of the numerals may be displayed at the rear of the display window 156 to be close to the display window 156. The unit of the numerals may be centimeter (cm) or inch (in). This embodiment illustrates the international unit system, cm, is displayed adjacent to the display window 156. Also, a triangular indicator 1561 may be displayed at one side of the display window 156. A vertex of the triangular indicator 1561 may be arranged to point at the scale or numeral of the ruler 151 to facilitate the user to recognize the height of the blade 131.

Therefore, according to the present disclosure, one side of the strip-shaped ruler 151, which is long and flexible, may be coupled to the elevating frame 141 to be movable together with the elevating frame 141 and another side thereof may be bent along the upper surface of the ruler guide portion 153 to be movable back and forth. Accordingly, when the height adjustment knob 143 is rotated to adjust the height of the blade 131, numerals and scales displayed on the ruler 151 can move in a lengthwise direction of the ruler guide portion 153, in response to the upward and downward movement of the elevating frame 141, so that the user can see the scale or numeral through the display window 156 provided on the inner cover 104.

Also, in the related art, scales or numerals which can be displayed on the height adjustment knob 143 along the circumferential direction has been limited to 20 mm to 60 mm within a one-cycle (360°) rotation section. However, according to the present disclosure, such scales or numerals may not be indicated on the height adjustment knob 143 but the flexible ruler 151 on which the scales or numerals are marked can be coupled to the elevating frame 141 so as to be movable up and down and back and forth along with movement of the elevating frame 141. Accordingly, even if the height adjustment knob 143 is rotated over 360°, an upper limit of the height of the blade can be set and displayed in a wider range of 60 mm or more.

In addition, the scales and numerals of the ruler can be visually seen through the display window 156 to improve visibility of the user, and the display window 156 can be provided on the inner cover 104 to be adjacent to the height adjustment knob 143, so as to facilitate the user to recognize the height of the blade 131 through the numeral or the like of the display window 156 when adjusting the height of the blade 131.

The ruler guide portion 153 may be disposed at the lower portion of the display window 156 so that the ruler 151 mounted on the elevating frame 141 can pass along the lower portion of the display window 156, and may be formed curved in a round shape, thereby minimizing abrasion and noise of the ruler 151 due to friction during movement along the guide hole 155 formed between the ruler guide portion 153 and the ruler guide cover 154.

The stop protrusion 1512 may be provided just above the lowest value of the height of the blade 131 displayed on the upper end portion of the ruler 151. Therefore, the stop protrusion 1512 of the ruler 151 can be locked in the bottleneck portion between the ruler guide portion 153 and the ruler guide cover 154, thereby preventing the ruler 151 from being separated from the ruler guide portion 153.

The first top cover 101 may be mounted on the upper portion of the outer cover 100 so as to cover the height adjustment knob 143, and formed rounded or inclined in a back and forth direction and a right and left direction so as to prevent water or the like from being accumulated on the outer cover 100. This can also prevent accumulation of rainwater in a recessed portion formed around the handle portion 1431 of the height adjustment knob 143.

The present disclosure is directed to solving the related art problems. An aspect of the present disclosure is to provide a lawn mower robot, capable of displaying a blade height in a wider range using a flexible ruler without displaying scales on a blade height adjustment lever of the related art.

In order to achieve the above aspect and other advantages of the present disclosure, there is provided with a lawn mower robot, including, an outer cover, an inner body accommodated inside the outer cover and having a plurality of wheels on both side surfaces for traveling, a rotating plate rotatably mounted on a bottom surface of the inner body, a plurality of blades rotatably mounted on the rotating plate to cut grass, a height adjustment unit to adjust height of the blades, and a height display unit to display the height of the blades, wherein the height display unit includes an inner cover mounted on an upper portion of the outer cover, a display window formed through one side of the inner cover, and a ruler having numerals on an upper surface thereof to display the height of the blades, and mounted inside the inner body to be movable in an up and down direction and a back and forth direction in correspondence to movement of the height adjustment unit.

According to an embodiment of the present disclosure, the height adjustment unit may include a height adjustment knob rotatably mounted on an upper portion of the inner body, a rotating cylindrical portion having male threaded portions on an outer circumferential surface thereof, and coupled to a lower portion of the height adjustment knob to be rotatable together with the height adjustment knob inside the inner body, and an elevating frame disposed inside the inner body to surround the rotating cylindrical portion and provided with spiral protrusions on an inner circumferential surface thereof to be engaged with the male threaded portions, so as to be movable up and down in response to rotation of the rotating cylindrical portion. The elevating frame may be provided with a blade driving motor mounted therein, and the blade driving motor may be coupled to a central portion of the rotating plate via a rotating shaft, so as to rotate the rotating plate.

According to an embodiment of the present disclosure, the ruler may be formed in a shape of a strip having a long length and a thin thickness, and may be flexible to be bent. According to an embodiment of the present disclosure, the elevating frame may further include a ruler mounting portion protruding laterally from one side surface thereof, and the ruler may be provided with a coupling portion on a lower end thereof to be coupled to the ruler mounting portion.

According to an embodiment of the present disclosure, the height display unit may further include a ruler guide portion protruding from the upper portion of the inner body to guide the ruler to be bent to a lower portion of the display window, a ruler guide cover mounted above the ruler guide portion so as to cover the upper portion of the ruler guide portion, and a guide hole formed between the ruler guide portion and the ruler guide cover, so that the ruler is inserted therethrough.

According to an embodiment of the present disclosure, the ruler guide portion may extend in a lengthwise direction of the inner body and protrude in a curved shape toward the display window. The ruler guide portion may be provided with an outlet and an inlet formed on front and rear portions of a lower surface thereof, respectively, to communicate with the guide hole. The ruler may extend upward from the elevating frame to be inserted into the guide hole through the inlet, be bent into a curved shape toward the front of the guide hole in the lengthwise direction so that the numeral is visible through the display window, and extend through the outlet to protrude through a lower portion of an inner space of the inner body.

According to an embodiment of the present disclosure, the ruler guide cover may be made of a transparent material so that the numeral displayed on the ruler can be seen through the display window. According to an embodiment of the present disclosure, the ruler may display natural numerals of 2 to 9 so that a height adjustment range of the blade is displayed as 2 cm to 9 cm.

According to an embodiment of the present disclosure, the ruler may be provided with a stop protrusion above a lowest value of the natural numerals displayed sequentially along a lengthwise direction of the ruler. According to an embodiment of the present disclosure, the ruler may be curved in an upside-down shape of "U", and a numeral disposed at a peak vertex on a curved surface of the curved ruler may indicate the height of the blade to a user through the display window.

According to an embodiment of the present disclosure, the lawn mower robot may further include a top cover mounted to an upper portion of the outer cover to be opened and closed and covering an upper portion of the height adjustment unit and the height display unit. The top cover may be disposed such that a central portion thereof is higher than both side end portions in a widthwise direction and a rear end portion is higher than a front end portion in a back and forth direction.

A lawn mower robot according to another embodiment of the present disclosure may include an outer cover, an inner body accommodated in the outer cover and having a plurality of wheels provided on both side surfaces thereof for traveling, a rotating plate rotatably mounted on a bottom surface of the inner body, a plurality of blades rotatably mounted on the rotating plate in a foldable manner so as to cut grass, a height adjustment knob rotatably mounted on an upper portion of the inner body to adjust height of the blades, a display window disposed on an upper portion of the outer cover, and a ruler mounted in the inner body to be movable back and forth in response to rotation of the height adjustment knob, and displaying a plurality of numerals on one surface thereof in a lengthwise direction so that a user can see the height of the blades through the display window, and a ruler guide portion protruding in a curved shape toward the display window to guide forward and backward movement of the ruler.

According to another embodiment of the present disclosure, the lawn mower robot may further include a ruler guide cover formed of a transparent material and mounted to cover a part of the ruler mounted to be movable along the ruler guide portion.

A lawn mower robot according to another embodiment of the present disclosure may include an outer cover, an inner body accommodated inside the outer cover, a plurality of blades rotatably mounted on a lower portion of the inner body to cut grass, a height adjustment knob rotatably mounted on an upper portion of the inner body to adjust height of the blades, a rotating cylindrical portion having male threaded portions on an outer circumferential surface thereof, and coupled to a lower portion of the height adjustment knob to be rotatable together with the height adjustment knob inside the inner body, an elevating frame having spiral protrusions on an inner circumferential surface thereof so as to be engaged with the male threaded portions, and mounted in the inner body to be moved up and down along rotation of the rotating cylindrical portion, a display window disposed on an upper portion of the outer cover, a ruler forming a plurality of numerals for displaying height of the blades along a lengthwise direction, and having one side coupled to an inside of the elevating frame and another side bent into a curved shape toward the display window so that at least one of the plurality of numerals is visible through the display window, a ruler guide portion protruding into a curved shape from an upper portion of the inner body toward the display window to guide movement of the ruler, and a ruler guide cover mounted to cover an upper portion of the ruler guide portion, having an inner surface spaced from an upper surface of the ruler guide portion, and provided with a guide hole through the inner surface so that the ruler is movable therethrough.

According to another embodiment of the present disclosure, a bottleneck portion may be formed between one side of an upper surface of the ruler guide portion and one side of the inner side surface of the ruler guide cover, and the ruler may be provided with a stop protrusion formed on one side thereof to be locked in the bottleneck portion.

Aspects of a lawn mower robot according to the present disclosure will be described as follows. First, one side of a strip-shaped ruler, which is long and flexible, may be coupled to an elevating frame to be movable together with the elevating frame and another side thereof may be bent along an upper surface of a ruler guide portion to be movable back and forth. Accordingly, when a height adjustment knob is rotated to adjust a height of a blade, numerals and scales displayed on the ruler can move in a lengthwise direction of the ruler guide portion, in response to upward and downward movement of the elevating frame, so that a user can see a scale or numeral through a display window provided on an inner cover.

Second, in the related art, scales or numerals which can be displayed on a height adjustment knob along a circumferential direction has been limited to 20 mm to 60 mm within a one-cycle)(360° rotation section. However, according to the present disclosure, such scales or numerals may not be marked on a height adjustment knob but a flexible ruler on which the scales or numerals are marked can be coupled to an elevating frame so as to be movable up and down and back and forth along with movement of the elevating frame. Accordingly, even if the height adjustment knob is rotated over 360°, an upper limit of a height of a blade can be set and displayed in a wider range of 60 mm or more.

Third, scales and numerals of a ruler can be visually seen through a display window to improve visibility of a user, and the display window can be provided on an inner cover to be adjacent to a height adjustment knob, so as to facilitate the user to recognize a height of a blade through the numeral or the like on the display window when adjusting the height of the blade.

Fourth, a ruler guide portion may be disposed at a lower portion of a display window so that a ruler mounted on an elevating frame can pass along the lower portion of the display window, and may be formed curved in a round shape, thereby minimizing abrasion and noise of the ruler due to friction during movement along a guide hole formed between the ruler guide portion and ruler guide cover.

Fifth, a stop protrusion may be provided just above the lowest value of a height of a blade displayed on an upper end portion of a ruler. Therefore, the stop protrusion of the ruler can be locked in a bottleneck portion between a ruler guide portion and a ruler guide cover, thereby preventing the ruler from being separated from the ruler guide portion.

Sixth, a first top cover may be mounted on an upper portion of an outer cover so as to cover a height adjustment knob, and formed rounded or inclined in a back and forth direction and a right and left direction so as to prevent water or the like from being accumulated on the outer cover. This can also prevent accumulation of rainwater in a recessed portion formed around a handle portion of the height adjustment knob.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
   an outer cover;
   an inner frame coupled to the outer cover and having a plurality of wheels on side surfaces thereof;
   one or more blades rotatably positioned at a lower surface of the inner frame to cut grass;
   a height adjustment module to adjust a height of the blades, the height adjustment module including a lifting frame configured to move vertically in the inner frame to adjust the height of the blades; and
   a height display to provide an indication of the height of the blades, wherein the height display includes:
      an inner cover coupled to the outer cover;
      a display window formed through a side of the inner cover; and
      a ruler strip having numerals on an upper surface thereof, and coupled to the inner frame such that a vertical movement of the height adjustment module changes a subset of the numerals on the upper surface of the ruler strip that are visible through the display window corresponding to the height of the blades,
   wherein the elevating frame further includes a ruler mounting surface protruding laterally from one side surface thereof, and
   wherein the ruler strip includes a coupling protrusion at a lower end thereof and is configured to be coupled to the ruler mounting surface.

2. The lawn mower robot of claim 1, wherein the height adjustment module further includes:
- a knob rotatably mounted on an upper surface of the inner frame; and
- a rotating cylinder having male threaded regions on an outer circumferential surface thereof, and coupled to a lower surface of the knob to be rotatable together with the knob inside the inner frame,
- wherein the elevating frame is provided laterally outside of the rotating cylinder and includes spiral protrusions on an inner circumferential surface thereof to engage the male threaded regions, so as to be movable up and down based on a rotation of the rotating cylinder, and
- wherein a motor to drive the blades is received in the elevating frame, and the motor is coupled to the blades via a rotating shaft.

3. The lawn mower robot of claim 1, wherein the ruler strip has a length that is greater than a width thereof and is flexible.

4. A lawn mower robot, comprising:
- an outer cover;
- an inner frame coupled to the outer cover and having a plurality of wheels on side surfaces thereof;
- one or more blades rotatably positioned at a lower surface of the inner frame to cut grass;
- a height adjustment module to adjust a height of the blades, the height adjustment module including a lifting frame configured to move vertically in the inner frame to adjust the height of the blades; and
- a height display to provide an indication of the height of the blades, wherein the height display includes:
  - an inner cover coupled to the outer cover;
  - a display window formed through a side of the inner cover; and
  - a ruler strip having numerals on an upper surface thereof and coupled to the inner frame such that a vertical movement of the height adjustment module changes a subset of the numerals on the upper surface of the ruler strip that are visible through the display window corresponding to the height of the blades,
- wherein the height display further includes:
  - a ruler guide surface protruding from an upper surface of the inner frame to guide the ruler strip to be bent to a lower portion of the display window;
  - a ruler guide cover mounted above the ruler guide surface so as to cover an upper region of the ruler guide; and
  - a guide hole formed between the ruler guide and the ruler guide cover, so that the ruler strip is inserted therethrough.

5. The lawn mower robot of claim 4, wherein the ruler guide surface extends in a lengthwise direction of the inner frame and protrudes in a curved shape toward the display window, and
- wherein the ruler guide surface includes an outlet and an inlet formed on front and rear portions of a lower surface thereof, respectively, to communicate with the guide hole, and the ruler strip extends upward from the elevating frame to be inserted into the guide hole through the inlet, is bent into a curved shape toward the front of the guide hole in the lengthwise direction so that one or more of the numerals are visible through the display window, and extends through the outlet to protrude through a lower region of an inner space of the inner body.

6. The lawn mower robot of claim 4, wherein the ruler guide cover includes a transparent material so that the numerals displayed on the ruler strip can be seen through the display window.

7. The lawn mower robot of claim 1, wherein the ruler strip displays numbers 2 to 9 corresponding to the height of the blades being 2 cm to 9 cm.

8. The lawn mower robot of claim 1, wherein the numerals are displayed sequentially along a lengthwise direction of the ruler strip, and the ruler strip includes a stop protrusion adjacent to a lowest value of the numerals.

9. A lawn mower robot, comprising:
- an outer cover;
- an inner frame coupled to the outer cover and having a plurality of wheels on side surfaces thereof;
- one or more blades rotatably positioned at a lower surface of the inner frame to cut grass;
- a height adjustment module to adjust a height of the blades, the height adjustment module including a lifting frame configured to move vertically in the inner frame to adjust the height of the blades; and
- a height display to provide an indication of the height of the blades, wherein the height display includes:
  - an inner cover coupled to the outer cover;
  - a display window formed through a side of the inner cover; and
  - a ruler strip having numerals on an upper surface thereof and coupled to the inner frame such that a vertical movement of the height adjustment module changes a subset of the numerals on the upper surface of the ruler strip that are visible through the display window corresponding to the height of the blades,
- wherein the ruler strip is configured to be curved into an inverted U shape, and one of the numerals positioned at a peak vertex on the curved ruler strip indicates the height of the blades through the display window.

10. A lawn mower robot, comprising:
- an outer cover;
- an inner frame coupled to the outer cover and having a plurality of wheels on side surfaces thereof;
- one or more blades rotatably positioned at a lower surface of the inner frame to cut grass;
- a height adjustment module to adjust a height of the blades, the height adjustment module including a lifting frame configured to move vertically in the inner frame to adjust the height of the blades;
- a height display to provide an indication of the height of the blades, wherein the height display includes:
  - an inner cover coupled to the outer cover;
  - a display window formed through a side of the inner cover; and
  - a ruler strip having numerals on an upper surface thereof and coupled to the inner frame such that a vertical movement of the height adjustment module changes a subset of the numerals on the upper surface of the ruler strip that are visible through the display window corresponding to the height of the blades; and
- a top cover coupled to an upper region of the outer cover to be opened and closed and covering upper regions of the height adjustment module and the height display, and
- wherein the top cover is positioned such that a central region thereof is higher than both side end regions thereof in a widthwise direction and a rear end region thereof is higher than a front end portion thereof in a back and forth direction.

11. The lawn mower robot of claim 1, further comprising a plate rotatably positioned at the lower surface of the inner frame, wherein the blades are mounted on the plate to cut grass when the plate is rotated.

12. A lawn mower robot, comprising:
an outer cover;
an inner frame coupled to the outer cover and having a plurality of wheels positioned at side surfaces thereof;
a one or more blades rotatably mounted at a lower surface of the inner surface to cut grass;
a knob rotatably positioned at an upper region of the inner frame to receive an input related to adjusting a height of the blades;
a display window provided at an upper region of the outer cover;
a ruler strip that displays a plurality of numerals on a surface thereof in a lengthwise direction;
a ruler guide surface protruding in a curved shape toward the display window to guide the ruler strip to move relative to the display window, such that a portion of the ruler stripe showing one of the numbers corresponding to the height of the blades is visible through the display window; and
a ruler guide cover formed of a transparent material and positioned to cover a part of the ruler strip that moves along the ruler guide surface.

13. The lawn mower robot of claim 12, further comprising:
a guide hole formed between the ruler guide surface and the ruler guide cover, the ruler strip being positioned therethrough.

14. The lawn mower robot of claim 13, wherein the ruler guide surface includes an outlet and an inlet formed on front and rear portions of a lower surface thereof, respectively, to communicate with the guide hole, and the ruler strip extends upward to be inserted into the guide hole through the inlet, is bent into a curved shape toward the front of the guide hole in the lengthwise direction so that one or more of the numerals are visible through the display window, and extends through the outlet to protrude through a lower region of an inner space of the inner body.

15. The lawn mower robot of claim 12, further comprising a plate rotatably positioned at the lower surface of the inner frame, wherein the blades are mounted on the plate to cut grass when the plate is rotated.

16. A lawn mower robot, comprising:
an outer cover;
an inner frame coupled to the outer cover;
a plurality of blades rotatably mounted on a lower surface of the inner frame to cut grass;
a knob rotatably positioned at an upper surface of the inner frame to adjust a height of the blades;
a rotating cylinder having male threaded regions on an outer circumferential surface thereof, and coupled to a lower end of the knob to be rotatable together with the knob in the inner frame;
an elevating frame having spiral protrusions on an inner circumferential surface thereof so as to be engaged with the male threaded regions of the rotating cylinder, and coupled to the inner frame to be moved vertically based on a rotation of the rotating cylinder;
a display window provided at an upper region of the outer cover;
a ruler strip that displays a plurality of numerals, and having one section coupled to the elevating frame and another section that is bent into a curved shape toward the display window so that at least one of the plurality of numerals is visible through the display window;
a ruler guide surface protruding into a curved shape from the upper surface of the inner frame and toward the display window to guide a position of the ruler strip relative to the display window; and
a ruler guide cover positioned to cover an upper region of the ruler guide surface, having an inner surface spaced from an upper surface of the ruler guide surface, and including a guide hole through the inner surface so that the ruler strip is movable therethrough.

17. The lawn mower robot of claim 16, wherein a bottleneck region is formed between one side of an upper region of the ruler guide surface and an opposing side of the inner side surface of the ruler guide cover, and
wherein the ruler strip includes a stop protrusion formed on one side thereof and having at least one dimension that is larger than a corresponding dimension of the bottleneck region to prevent the stop protrusion from passing through the bottleneck region.

18. The lawn mower robot of claim 16, wherein the ruler strip is configured to be curved into an inverted U shape, and one of the numerals positioned at a peak vertex on the curved ruler strip indicates the height of the blades through the display window.

* * * * *